United States Patent
Saylor et al.

(10) Patent No.: US 9,697,350 B1
(45) Date of Patent: *Jul. 4, 2017

(54) ELECTRONIC SIGNING OF CONTENT

(71) Applicant: MicroStrategy Incorporated, Vienna, VA (US)

(72) Inventors: Michael J. Saylor, Vienna, VA (US); Gang Chen, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,146

(22) Filed: Mar. 16, 2015

Related U.S. Application Data

(63) Continuation of application No. 13/861,723, filed on Apr. 12, 2013, now Pat. No. 8,984,288.

(60) Provisional application No. 61/783,425, filed on Mar. 14, 2013.

(51) Int. Cl.
*H04L 9/32* (2006.01)
*G06F 21/45* (2013.01)

(52) U.S. Cl.
CPC .................... *G06F 21/45* (2013.01)

(58) Field of Classification Search
CPC . H04L 63/0823; H04L 63/101; H04L 63/166; H04L 63/20; H04N 21/25816; H04N 21/2585; H04N 21/43615; H04N 21/44231; H04N 21/4516; H04N 21/454; H04N 21/4623; H04N 21/6334; H04N 7/165; G06F 17/30011; G06F 21/46; G06F 21/6209; G06F 21/6218; G06K 19/16; G06K 9/00154; G06Q 10/10; G06Q 50/18; H04M 1/72527; H04W 12/10; H04W 4/008; H04W 4/02; H04W 8/20
USPC ........................................................ 713/176
See application file for complete search history.

(56) References Cited

U.S. PATENT DOCUMENTS

| | | |
|---|---|---|
| 7,958,361 B2 | 6/2011 | Hayashi |
| 8,065,527 B2 | 11/2011 | Veluchamy |
| 8,145,909 B1 * | 3/2012 | Agrawal .............. G06F 21/6209 713/176 |

(Continued)

OTHER PUBLICATIONS

Wikipedia, "Certificate authority," Wikipedia [online] Aug. 8, 2012 [retrieved on Aug. 15, 2012]. Retrieved from the Internet: <URL: http://en.wikipedia.org/wiki/Certificate_authority>, 4 pages.

(Continued)

*Primary Examiner* — Kambiz Zand
*Assistant Examiner* — Abiy Getachew
(74) *Attorney, Agent, or Firm* — Fish & Richardson P.C.

(57) ABSTRACT

This specification describes technologies relating to applying electronic signatures to content items. In general, one aspect of the subject matter described in this specification can be embodied in methods that include receiving a content item and receiving a request to electronically sign the content item by a user by associating the content item with a credential associated with the user, the request comprising data identifying the credential from among a set of credentials that are associated with the user. The method may further include generating a package comprising the content item and data for the identified credential.

20 Claims, 10 Drawing Sheets

(56) References Cited

U.S. PATENT DOCUMENTS 8,363,944 B2* 1/2013 Koike .................. G06F 21/608
  382/181
8,667,290 B2 3/2014 Appelbaum

OTHER PUBLICATIONS

Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.

Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.

Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.

Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.

Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.

Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.

Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.

Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.

Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.

Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.

Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.

U.S. Non-Final Office Action for U.S. Appl. No. 13/861,723 dated Aug. 12, 2014, 22 pages.

U.S. Notice of Allowance for U.S. Appl. No. 13/861,723 dated Dec. 3, 2014, 7 pages.

\* cited by examiner

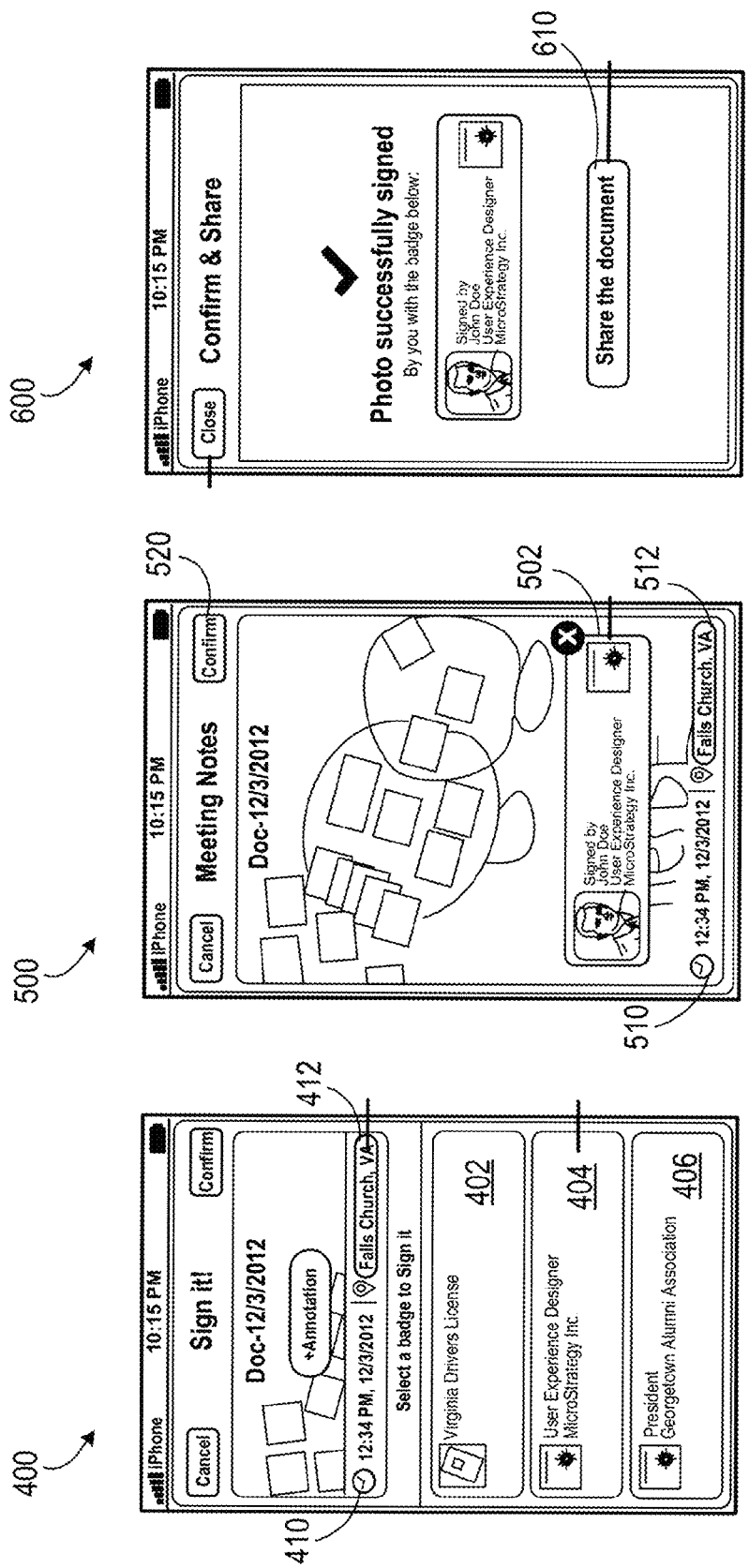

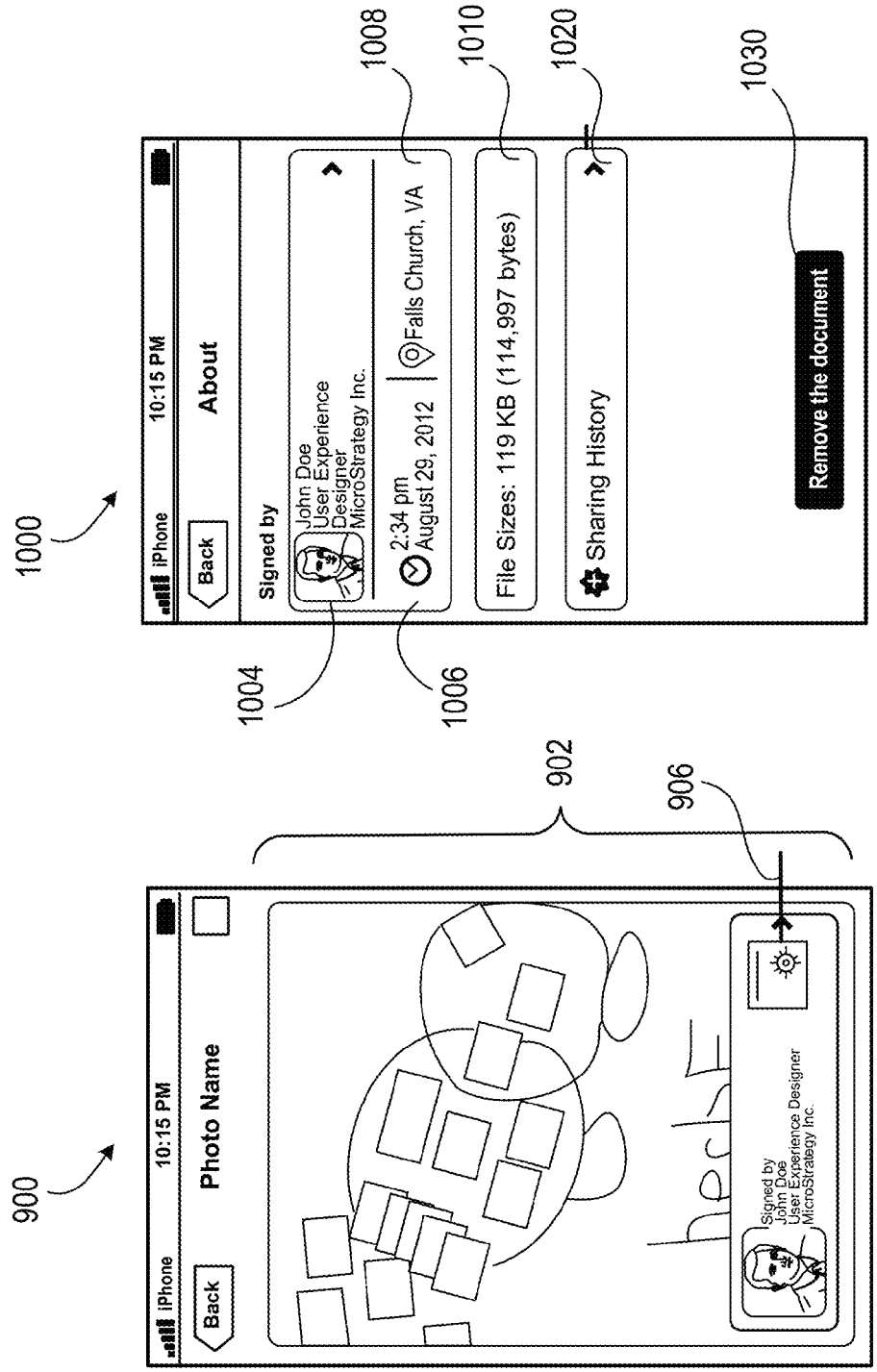

ELECTRONIC SIGNING OF CONTENT

CLAIM OF PRIORITY

This application is a continuation (and claims the benefit of priority under 35 USC 120) of U.S. application Ser. No. 13/861,723, filed Apr. 12, 2013, now allowed, which claims priority under 35 U.S.C. §119(e) to provisional U.S. Patent Application 61/783,425, filed on Mar. 14, 2013. The entire contents of both of these prior application are hereby incorporated by reference.

BACKGROUND

Various methods can be used to establish or verify the identity and authority of an individual. For example, people use physical badges to identify themselves and establish their authority or permissions in a variety of contexts. For example, a person may present an employee badge to gain access to an employer's secure building.

Paper documents can be signed to associate a person with the document in a reasonably verifiable manner. The document may have different significance or meaning depending on the identity and authority of a person who signs the document.

SUMMARY

In one aspect of the present disclosure, a method performed by one or more processing devices includes receiving a content item. The method may further include receiving a request to electronically sign the content item by a user by associating the content item with a credential associated with the user, the request comprising data identifying the credential from among a set of credentials that are associated with the user. The method may further include generating a package comprising the content item and data for the identified credential.

Implementations of the disclosure can include one or more of the following features. In some implementations, a digital signature for the package is determined and the package may be transmitted or stored with the digital signature. The digital signature may be determined based in part on a private key that corresponds to a public key associated with an entity that manages the set of stored credentials for a plurality of users. Generating the package may further include including, in the package, data reflecting a time associated the request to electronically sign. Generating the package may further include including, in the package, data reflecting a geographic location associated with the request to electronically sign. The request to electronically sign may be received from a first device associated with the user. The package may be transmitted with the digital signature to a second device associated with a different user. The data for the identified credential may be retrieved from a data storage device that is local to the one or more processing devices. The data for the identified credential may be retrieved from a remote processing device associated with an entity that issued the credential. A QR code within which a reference to the data for the identified credential is encoded may be embedded in the content item. The data for the credential may include a photograph of a user associated with the credential. A request to electronically sign the content item by the user, by associating the content item with a second credential associated with the user, may be received. The request may include data identifying the second credential from among the set of credentials that are associated with the user. Generating the package may further include including data for the second credential in the package. The identified credential and the second credential may be issued by different entities. The identified credential may be issued by a first entity and the second credential may also issued by the first entity. A request to electronically sign the content item, by associating the content item with a second credential, may be received. The request may include data identifying the second credential from among a set of credentials that are associated with a different user. Generating the package may further include including data for the second credential in the package. A condition for electronic signature associated with the identified credential may be checked to determine whether the condition is satisfied by the request to electronically sign the content item. The package may be generated responsive to determining that the condition is satisfied. The condition may require the request to electronically sign the content item to be sent within one or more specified periods of time. The condition may require the request to electronically sign the content item to be sent from within one or more specified geographic regions. An annotation may be applied to the content item before adding the content item to the package. The annotation may include an image of a handwritten signature of the user.

In still another aspect of the disclosure, one or more machine-readable media are configured to store instructions that are executable by one or more processing devices to perform operations including receiving a content item. The operations may further include receiving a request to electronically sign the content item by a user by associating the content item with a credential associated with the user, the request comprising data identifying the credential from among a set of credentials that are associated with the user. The operations may further include generating a package comprising the content item and data for the identified credential.

In still another aspect of the disclosure, an electronic system includes one or more processing devices; and one or more machine-readable media configured to store instructions that are executable by the one or more processing devices to perform operations including: receiving a content item. The operations may further include receiving a request to electronically sign the content item by a user by associating the content item with a credential associated with the user, the request comprising data identifying the credential from among a set of credentials that are associated with the user. The operations may further include generating a package comprising the content item and data for the identified credential.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims.

BRIEF DESCRIPTION OF THE DRAWINGS

FIGS. 4-6 illustrate examples of graphical user interfaces for electronically signing a content item.

FIGS. 9-10 illustrate examples of graphical user interfaces for displaying an electronically signed content item with information about a credential used to electronically sign the content item.

DETAILED DESCRIPTION

Figure 3:
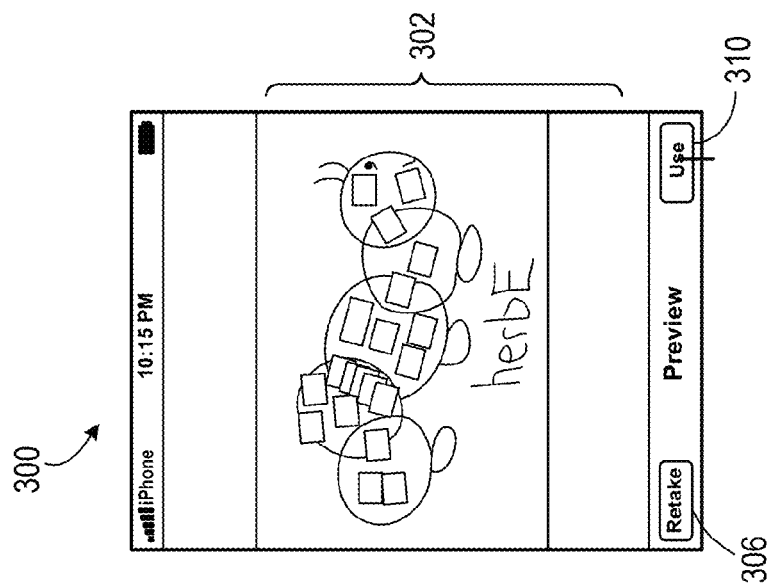
FIG. 3 illustrates an example of a graphical user interface for reviewing a captured image file.

A system consistent with this disclosure provides an application through which users may electronically sign and share content items (e.g., photographs, text files, video files, audio files, etc.). In some implementations, the application enables a user to manage and utilize multiple credentials, each potentially issued by a different credential issuing body. The application also may enable the user to select one or more of the credentials available on the user's mobile device to use to apply an electronic signature to a content item such that the electronic signature later can be used by another user to identify the one or more credentials that the user used to electronically sign the content item.

In some implementations, a content item is electronically signed by generating a package that includes the content item and information indicative of a credential that has been selected for signing the content item. Additionally or alternatively, the package may be digitally signed using a private key held by a trusted server system that manages credentials of many users.

In some implementations, an annotation may be applied to a content item. For example, an image of a user's handwritten signature or initials may be overlaid on a visual representation of a content item.

Furthermore, in some implementations, a content item may be electronically signed by multiple users. In such implementations, information corresponding to credentials of each of the signers may be included in a package to form an electronically signed content item.

In an illustrative example, employees may electronically sign content items with credentials issued by their employer, as described below. An employee may have other credentials, such as a gym membership credential or a museum membership credential, among others. All of these credentials may be managed by a credential management application server, and the employee may access and utilize the credentials using a client application that runs on the employee's mobile phone (or other computing device). The employee may generate a content item by taking a photograph with the employee's mobile phone. The employee's handwritten initials may be overlaid on the photograph as an annotation. The employee may then electronically sign the photograph using one or more of the employee's credentials. Once the photograph has been electronically signed by the employee, the employee may share the electronically signed photograph with another user of the credential management application. For example, the employee may share the electronically signed photograph with a coworker of the employee.

When the coworker receives the electronically signed photograph, the coworker is able to view both the photograph and information about the credential that the employee used to electronically sign the photograph. For example, the coworker may be able to view a badge on the coworker's mobile device that represents the employee's credential that was used to electronically sign the photograph. The coworker also may electronically sign the photograph with a credential associated with the coworker. Thereafter, the coworker may share the content item, electronically signed by both the employee and the coworker, with a third user.

A content item as described herein may be any data that can be provided over an electronic communications network. Examples of content items include image files, video files, streamed video, audio files, streamed audio, webpages, text files, and portable document format (PDF)files, among others.

Figure 1:
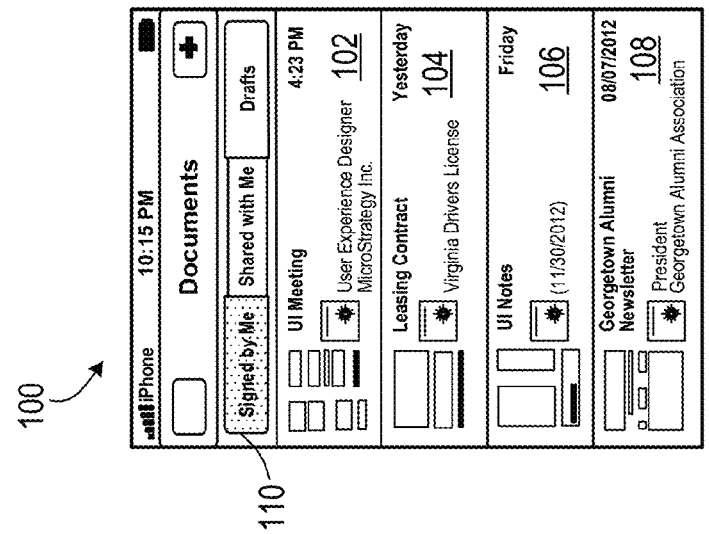
FIG. 1 illustrates an example of a graphical user interface for displaying a list of electronically signed content items.

FIG. 1 illustrates an example of a graphical user interface 100 for displaying a list of content items (102, 104, 106, and 108) that have been electronically signed by a user (as described below). In the example of FIG. 1, graphical user interface 100 is displayed on a client device through an application, including, e.g., an application for managing credentials. In the example of FIG. 1, graphical user interface 100 includes a tab 110 for accessing the list of content items that have been electronically signed by the user. In some implementations, the content items (102, 104, 106, and 108) listed may be stored on a remote server (e.g., a credential management application server), and the server may make the content items available to the user through the use of the application running on the client device. Graphical user interface 100 may also include an add document icon 120, that may be selected by the user to add a new document that will be electronically signed by the user using one or more of his credentials.

Figure 2:
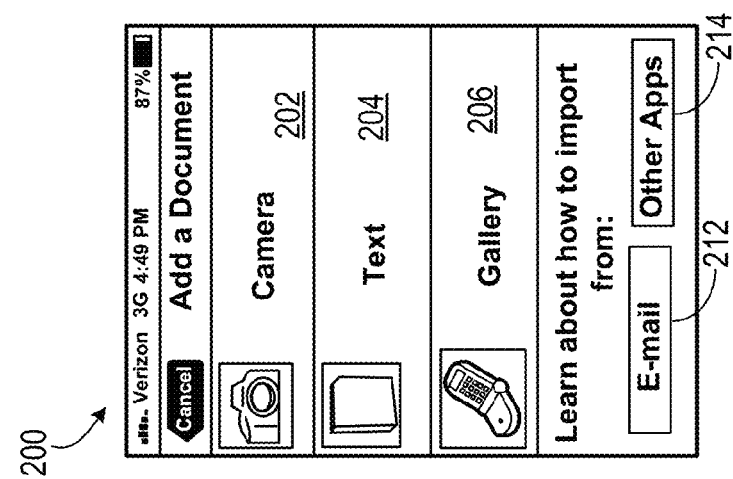
FIG. 2 illustrates an example of a graphical user interface for acquiring or creating a content item that may be electronically signed.

FIG. 2 illustrates an example of a graphical user interface 200 for adding a content item to the list of content items electronically signed by the user. In an example, graphical user interface 200 is displayed, e.g., following selection of icon 120 of graphical user interface 100 (FIG. 1). In the example of FIG. 2, the user is presented with a number of options for creating or accessing content items that may be electronically signed, including: a camera icon 202 for creating a photograph using a camera integrated in the user's mobile device; a text icon 204 for launching a text editor interface that facilitates the creation of a text file; a gallery icon 206 for browsing existing content items available on the users mobile device; an e-mail icon 212 for importing content items (e.g., an e-mail or an attachment to an e-mail) from an e-mail application; and an "other apps" icon 214 for importing content items from other applications installed on the user's mobile device. For example, by selecting camera icon 202, a user may launch a camera application on the mobile device for facilitating capture of a photograph by the mobile device.

FIG. 3 illustrates an example of a graphical user interface 300 for reviewing a captured image file. After a new image 302 has been captured, the user may preview the image to confirm that the image meets the user's needs. In this example, a captured photograph of a drawing and a collection of sticky-notes on a white board is presented for review in graphical user interface 300. If the image is not acceptable, the user may select a "retake" icon 306 to make another attempt at capturing a new image. If the image is acceptable, the user may select a "use" icon 310 to proceed to electronically signing the new content item, in this example, photograph 302.

FIG. 4 illustrates an example of a graphical user interface 400 for electronically signing a content item (e.g., photograph 302). Graphical user interface 400 may facilitate selection of one or more of the user's credentials (402, 404, and 406) for use in electronically signing the content item. Graphical user interface 400 also includes a display of the current time 410 and the current location 412 of the user's mobile device during the electronic signing process. The time and location of the electronic signature may be stored as part of an electronically signed content package.

FIG. 5 illustrates an example graphical user interface 500 that displays a content item along with information for a credential selected for an electronic signature. In this example, the user has selected credential 404 in graphical interface 400. Once a credential has been selected for signing the content item (e.g., a photograph), the content item may be displayed along with information 502 about the credential that will be used to electronically sign the content item. Graphical user interface 500 may also display a time 510 and a location 512 that will be recorded as part of the electronic signature that may indicate the time and location at which the electronic signing process was carried out. If the proposed electronic signature with the selected credential is acceptable, the user may select the "confirm" icon 520. Pressing confirm icon 520 may cause the proposed electronically signed content item to be generated, for example, by a credential management application server.

In some implementations, a code (e.g., a QR code) that references the credential used to sign the document may be embedded within the content item. In such implementations, if the content item subsequently is printed or otherwise converted into physical form, the code may be printed on the hardcopy version of the content item. The code then can be scanned and decoded to access information about who signed the document. For example, responsive to receipt of the decoded code from a client device, the credential management application server may return information to the client device about the credential used to sign the document.

FIG. 6 illustrates an example of a graphical user interface 600 for displaying a confirmation message that indicates the electronically signed content item has been successfully generated by, for example, a credential management application server. The confirmation message includes an indication 606 of which of the user's credentials was used to electronically sign the content item. In the example of FIG. 6, graphical user interface 600 includes a "share the document" icon 610 that, when selected by a user, facilitates sharing the document with other users. For example, selecting icon 610 may cause an address book of other users to be displayed that may be used to select one or more proposed recipients of the new electronically signed content item. When recipients of an electronically signed content item are selected, the electronically signed content item may be shared with those recipients. The recipients may receive a message notifying the recipient that the electronically signed content item is accessible to the recipient (e.g., through access to the credential management application server).

As an alternative to the example illustrated in FIGS. 1-6, in some implementations, when a user intends to electronically sign a photograph, the user may select a credential to be used to electronically sign the photograph prior to taking the photograph instead of after taking the photograph. In such implementations, the photograph may be automatically electronically signed using the selected credential as part of the photograph capture or import process.

Figure 7A:
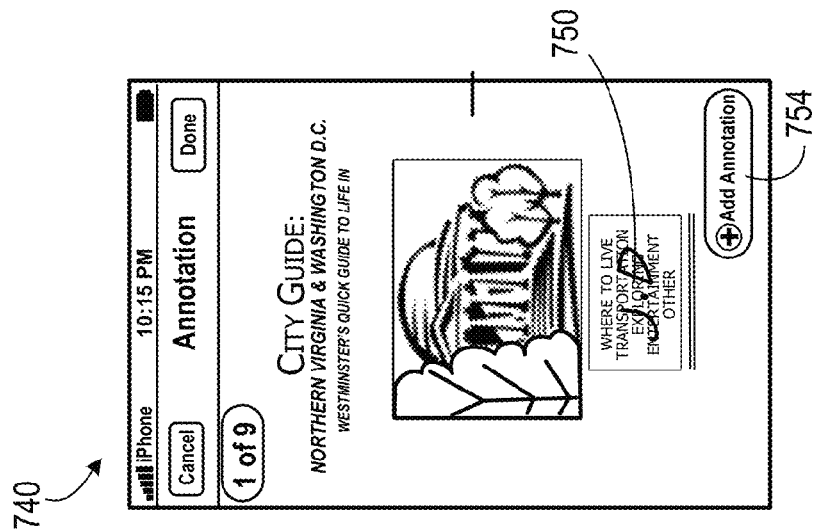
FIGS. 7A-7C illustrate examples of graphical user interfaces for applying an annotation to a content item.

FIG. 7A illustrates an example of a graphical user interface for applying an annotation to a content item. In this example, graphical user interface 700 facilitates the selection of one or more credentials (e.g., credentials 702, 704, and/or 706) for electronically signing a content item 708 that has been imported from a gallery or another application. For example, graphical user interface 700 may be displayed responsive to user selection of icon 206 in graphical user interface 200. Graphical user interface 700 also includes an icon 710 for adding an annotation to the content item 708. An annotation may be added to the content item before the user electronically signs the content item.

Figure 7B:
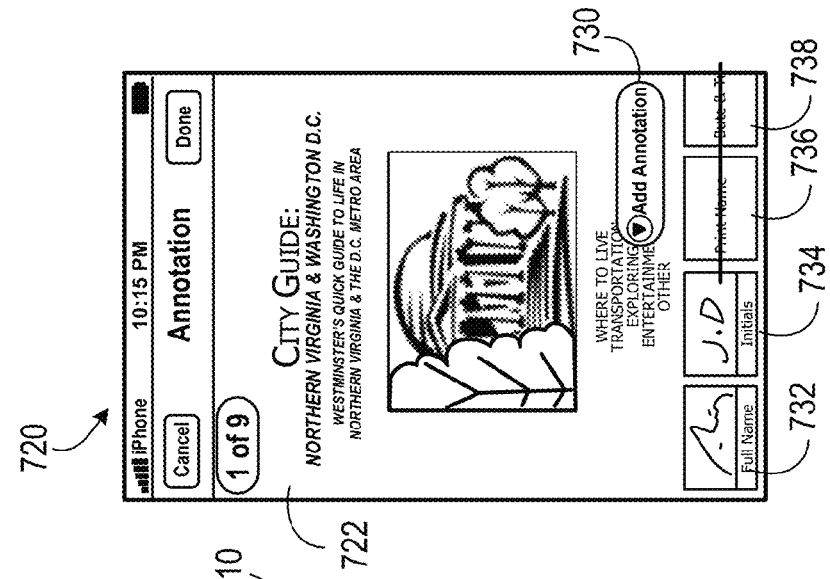

When the add annotation icon 710 is selected by a user, graphical user interface 720 of FIG. 7B is presented to the user to facilitate application of an annotation to the content item 708. Graphical user interface 720 includes an expandable annotation selection icon 730 that, when expanded as illustrated in FIG. 7B, displays a list of available annotations associated with a user or one or more credentials of the user. In this example, four annotations are available for application to the content item, including a handwritten signature 732 associated with a user, handwritten initials 437 of the user, a printed name 736 of the user, and a current date and time display 738. In some implementations, annotations available to be applied to the content item may be stored locally on a user's mobile device and/or annotations available to be applied to the content item may be stored on a server. In some implementations, selection of the printed name annotation icon 736 may open a text editor that allows a user to enter text for the user's name (or other text) that is added to the content item as an annotation.

Figure 7C:
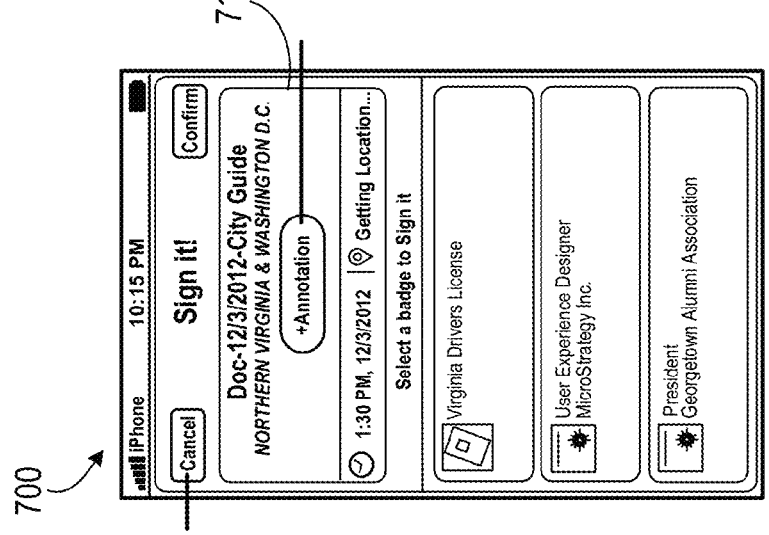

When one of the annotations (e.g., the handwritten initials 734) is selected by the user, a corresponding annotation 750 is applied to the content item 708, as shown in graphical user interface 740 of FIG. 7C. The annotation may be superimposed over the image of the content item 708 at a desired location. In some implementations, the application may enable the user to adjust the size of the annotation and/or drag the annotation to a desired location within the image of the content item 708. For example, the application may enable the user to size and/or position the annotation using gestures entered through a touch-screen display. Graphical user interface 740 also includes a collapsed expandable annotation selection icon 754, which may be selected and expanded to facilitate selection of an additional annotation for application to the content item 708. After the annotation has been applied, a user may select the done icon 758 to return to graphical user interface 700 of FIG. 7A and electronically sign the document using one of the credentials (702, 704, 706) according to the techniques described above.

In the examples described above, the graphical user interfaces of FIGS. 1-6 and 7A-7C are presented to a first user, John Doe, who interacts with the graphical user interfaces to electronically sign content items, including photograph 302. Continuing with the examples described above, after electronically signing photograph 302, the first user, John Doe, shares the electronically signed photograph 302 with a second user who is able to access the electronically signed photograph 302, including information about the credential that the first user, John Doe, used to electronically sign the photograph 302, through the graphical user interfaces of FIGS. 8-10 and 11A-11B.

Figure 8:
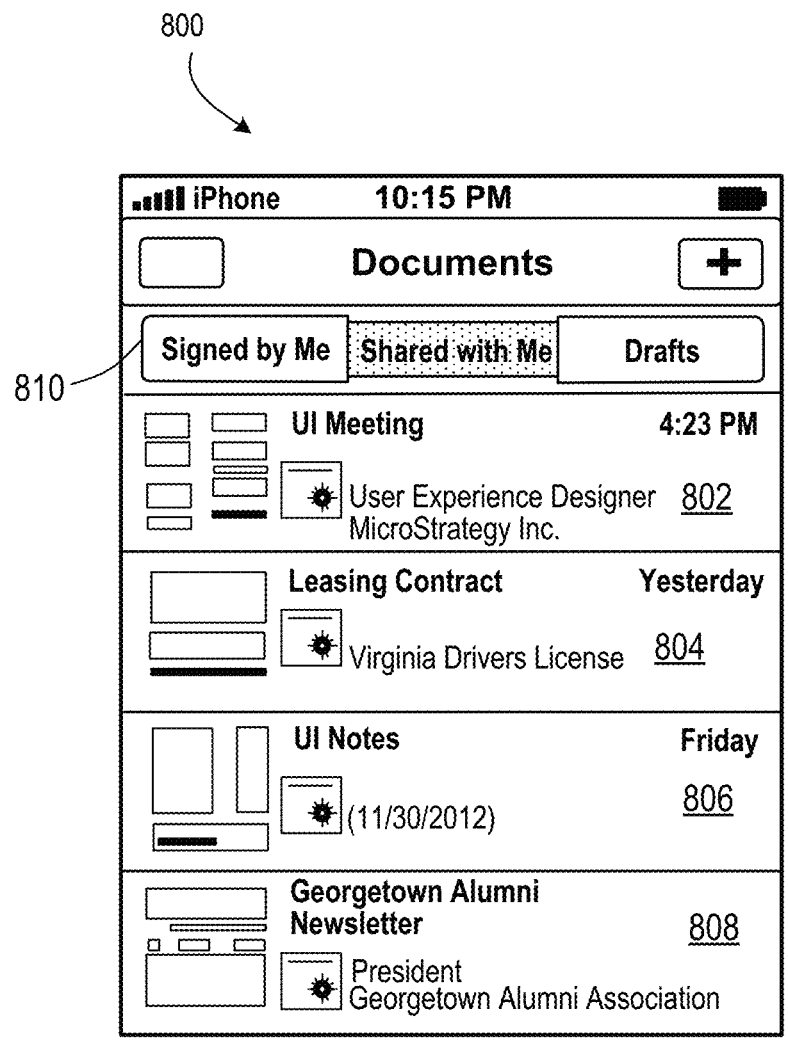
FIG. 8 illustrates an example of a graphical user interface for displaying a list of electronically signed content items shared with a user by other users.

FIG. 8 illustrates an example of a graphical user interface 800 for displaying a list of electronically signed content items (802, 804, 806, and 808) that have been shared with a user by other users. In this example, signed content item 802 is the signed and shared version of photograph 302 described above in connection with FIGS. 3-6 that has been shared with the user by John Doe. The list of shared content items (802, 804, 806, and 808) may be displayed in a "shared with me" tab 810 of graphical user interface 800. The user who has received these shared content items (802, 804, 806, and 808) may select a content item (e.g., content item 804) from the list to cause the selected content item to be displayed along with information about a credential that was used to electronically sign the content item.

In some implementations, the recipient of an electronically signed content item that has been shared with the recipient only may be allowed to access the content item (or view information about a credential used to electronically sign the content item) if the recipient possesses the same credential as was used to electronically sign the content item (or a credential issued by the same credential issuing organization as the credential that was used to electronically sign the content item).

FIG. 9 illustrates an example of a graphical user interface 900 for displaying an electronically signed content item 902 with information about a credential 906 that has been used to electronically sign the content item. In this example, graphical user interface 900 is presented responsive to the selection of signed content item 802 in graphical user interface 800. When a recipient of a shared electronically signed content item 902 accesses the content item, the content item is displayed with an indication of the credential 906 that was used to electronically sign the content item overlaid on the display of the content item 902.

In some implementations, when a code (e.g., QR code) has been embedded within the content item as described above, the code is displayed embedded within the signed content item 902 in graphical user interface 900.

The selection of the indication of credential 906 that was used to electronically sign the content item may cause more information about the electronic signature to be displayed, as shown in the example graphical user interface 1000 of FIG. 10. Graphical user interface 1000 may include an icon 1004 identifying the credential used to electronically sign the content item, an indication of the time 1006 when the content item was electronically signed, an indication of the location 1008 where the content item was electronically signed, and information about the electronically signed content item, such as the file size 1010. Graphical user interface 1000 may also include an icon 1030 for causing the electronically signed content item 902 to be removed from the recipient user's list of shared content items.

Figure 11B:
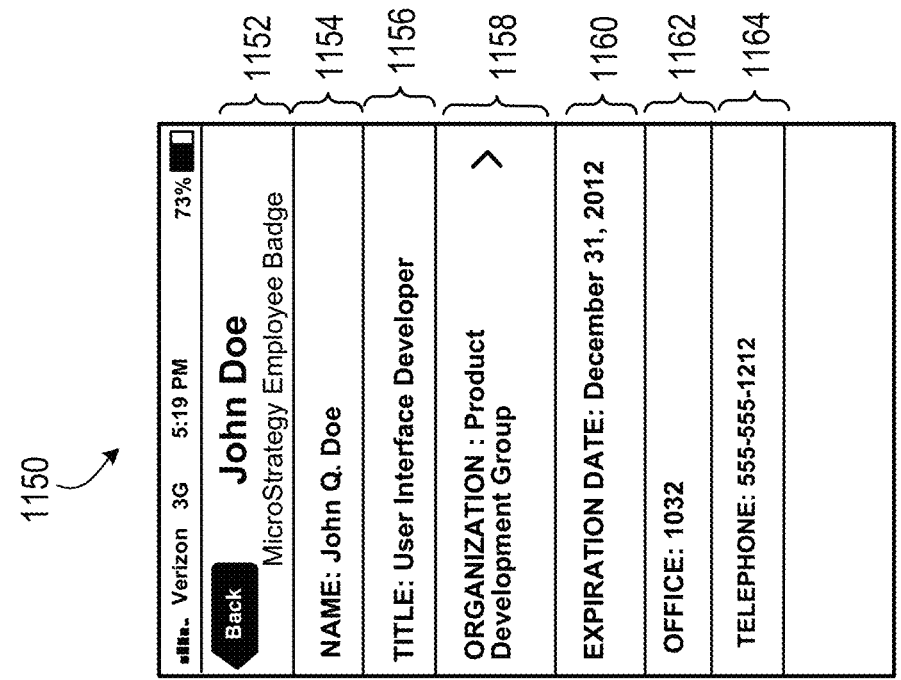
FIGS. 11A-11B illustrate examples of graphical user interfaces for displaying a badge representing a credential.
Figure 11A:
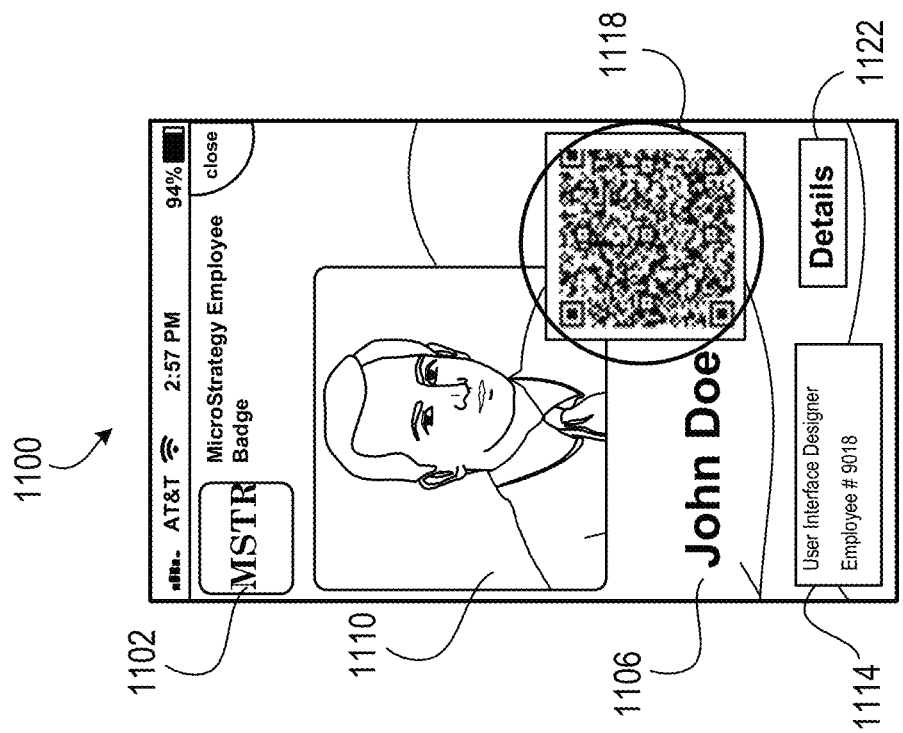

When the icon 1004 is selected, it may cause additional information about the credential used to electronically sign the content item 902 to be presented in the form of a badge representing the credential, as shown in the example graphical user interface of FIGS. 11A and 11B.

FIG. 11A illustrates an example graphical user interface 1100 on a client device that is used to display a portion of a badge that represents a credential used to electronically sign content item 902. In this example, the user, "John Doe," has electronically signed the content item 902 using an employee credential issued by his employer. A portion of the badge that may correspond to the front of a physical badge is displayed in graphical user interface 1100. Graphical user interface 1100 includes an identifier 1102 (e.g., a distinctive mark) of the credential issuing organization that issued the credential (e.g., the signing user's employer). Graphical user interface 1100 may also include the name 1106 and a photograph 1110 of a user associated with the credential. Graphical user interface 1100 may also include information about the credential and/or the associated user 1114, such as an employee's title and an employee identification number.

Graphical user interface 1100 may also include a "details" icon 1122 that, when selected by a user, causes graphical user interface 1150 of FIG. 11B to be displayed. For example, graphical user interface 1150 may correspond to the back of a physical badge. For example, graphical user interface 1100 may include a name for the credential 1152, a name of a user 1154 associated with the credential, a title of the user 1156 associated with the credential, a name of an organization 1158 associated with the credential, an indication of an expiration date 1160 for the credential, an office number 1162 of the user associated with the credential, and a telephone number 1164 of the user associated with the credential. When an icon displaying the name of the organization associated with the credential is selected by a user, additional information about the organization may be displayed.

Figure 12:
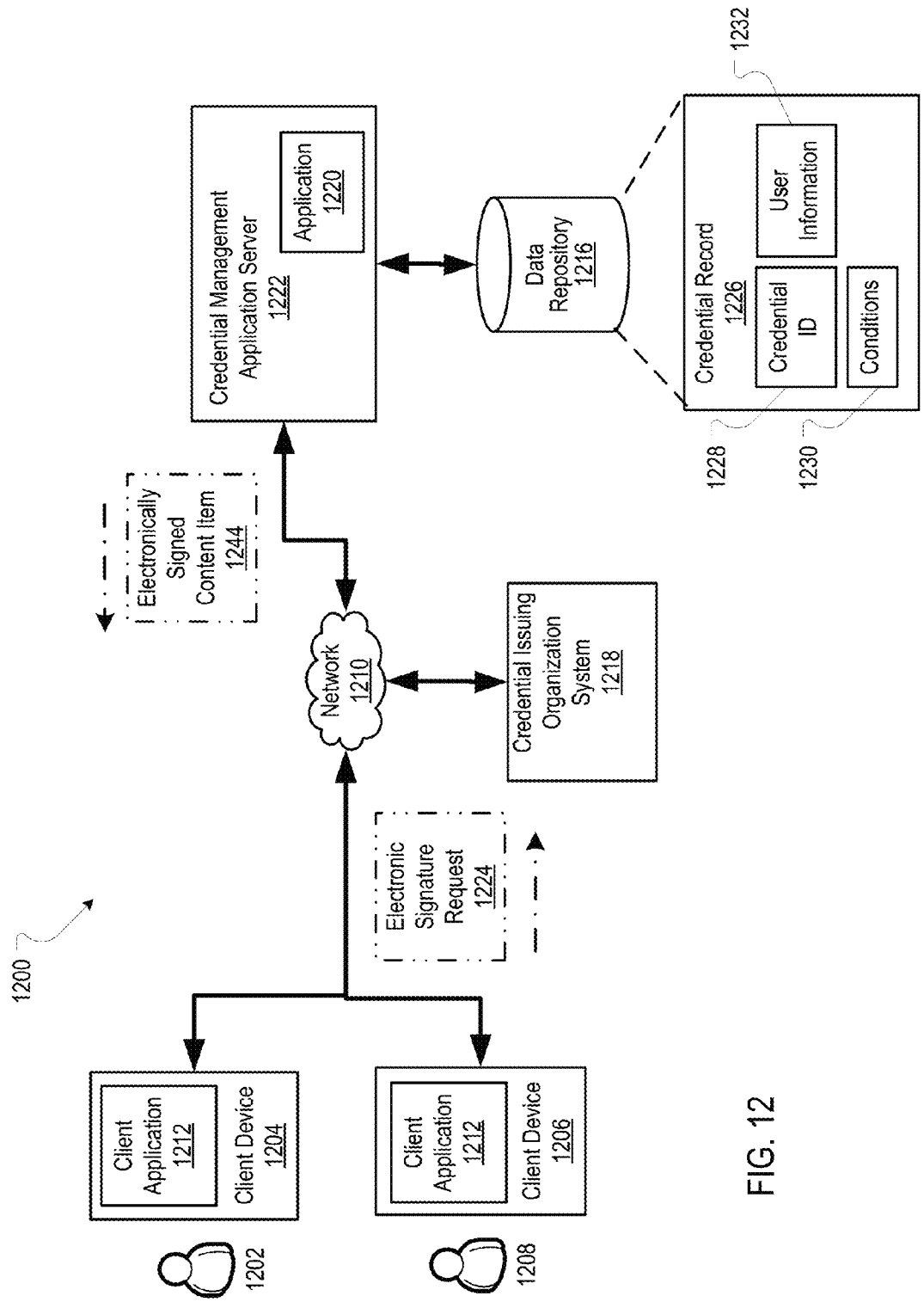
FIG. 12 is a block diagram of an example of a network environment enabling electronic signing of content items with credentials.

FIG. 12 is a block diagram of an example network environment 1200 enabling sharing and electronic signing of content items with credentials. Network environment 1200 includes network 1210, client devices 1204, 1206, credential management application system 1222, data repository 1216, and credential issuing organization systems 1217, 1218. Network environment 1200 may include many thousands of data repositories, client devices, application systems, and credential issuing organization systems, which are not shown.

In an example, client device 1204 is associated with user 1202. In this example, user 1202 may electronically sign content items and share those contents items and/or receive electronically signed content items shared by other users. Client device 1206 is associated with user 1208. In this example, user 1208 may electronically sign content items and share those contents items and/or receive electronically signed content items shared by other users.

In the example of FIG. 12, application system 1222 includes a system that hosts applications, including, e.g., application 1220. In this example, application 1220 is an application that manages credentials for users and facilitates electronic signing of content items by the users using one or more of their credentials. In an example, client devices 1204, 1206 may download a client application 1212 for interacting with application 1220 from credential management application system 1222 (or another system). In another example, client devices 1204, 1206 may use a web browser to access application 1220 from credential management application system 1222, e.g., rather than downloading a client application for interacting with application 1220 onto client devices 1204, 1206. In an example, application 1220 and/or a client application 1212 for interacting with application 1220 may be configured to render one or more of graphical user interfaces 100, 200, 300, 400, 500, 600, 700, 720, 740, 800, 900, 1000, 1100, and 1150, as shown in FIGS. 1-11B, respectively. In this example, through application 1220 and/or a client application 1212 for interacting with application 1220, users 1202, 1208 of client devices 1204, 1206, respectively, may electronically sign content items using credentials managed by merchant system 1222 (e.g., a credential issued by credential issuing organization system 1218) and share the electronically signed content items with other users, including each other.

Credentials may be issued to users by one or more credential issuing organizations. For example, an employer may be a credential issuing organization that issues credentials to its employees (e.g., a credential that is specific to an employee's job function(s)). Some other examples of credential issuing organizations are a government agency, a telecommunications service provider, a banking or other financial services institution, a gym, or a museum, among others. Credentials may be used by credential holders to gain access to service or facilities provided by a credential issuing organization and/or to act on behalf of a credential issuing organization.

Credential issuing organization system 1218 may be operated by a credential issuing organization (e.g., an employer of users 1202, 1208). Credential management application system 1222 may provide an interface (e.g., via communications over network 1210) to the credential issuing organization system 1218 to allow for the specification of credential properties and issuing of credentials to users. In some implementations, credential issuing organization system 1218 provides a user (e.g., user 1202) with a token that matches data associated with a credential that is communicated to the credential management application system 1222 through its credential issuing organization interface. The user may then present the token to the credential management application system 1222 as part of a credential registration request sent from the user's client device (e.g., client device 1204) to associate the credential with the user's client device.

The credential management system 1222 may enable users (e.g., users 1202, 1208) to store, manage, and/or access various different credentials issued by one or more different credential issuing organizations through credential management system 1222. An individual user may have credentials from multiple credential issuing organizations (e.g., credential issuing organization 1217 and credential issuing organization 1218). For example, a user (e.g., user 1202) may have credentials issued by the user's employer, a government agency (e.g., a driver's license, passport, or other identity card), and a bank where the user has an account. An individual user may also have multiple credentials issued by the same credential issuing organization. For example, an employer may issue multiple credentials to an employee user (e.g., user 1202). Different credentials from the employer may provide different permissions and/or authority to the user, corresponding to different job functions that the user performs as an employee.

Credential management application system 1222 stores, in data repository 1216, information about credentials managed by application 1220. For example, when user 1202 registers a new credential, the credential management application system 1222 stores, in data repository 1216, a credential record 1226, including, e.g., information indicative of the assignment of the new credential to user 1202. In this example, the credential record 1226 includes information identifying a credential 1228 that has been issued by credential issuing organization system 1218, information specifying conditions 1230 associated with the credential (e.g., conditions associated with the use of the credential), and user information 1232 that identifies a user identity for user 1202 (e.g., a unique identification code for a user identity or a pointer to a user identity record in the data repository 1216 or remote data storage system). In some implementations, the user information 1232 also includes (or points to) data for the assigned user that may be relayed through the application 1220 to another user when a shared content item electronically signed by the user 1202 is accessed. For example, the user information 1232 may include a name for user 1202, a photograph of user 1202, demographic information for user 1202, or other personally identifying information for user 1202, including, e.g., a biometric identifier for user 1202.

The credential record 1226 may enable identification of the user based on the credential ID 1228. For example, a received credential may be cross referenced against credentials (or information related to credentials) stored in credential records to find user information 1232.

In some implements, conditions 1230 for a credential may include an expiration date, after which the credential may no longer be accessed and used by user 1202. Additionally or alternatively, conditions 1230 for a credential may include limitations on the time(s) or location(s) where a credential may be accessed and/or used. For example, a condition 1230 may require that a user's device (e.g., client device 1204) be located in one of a list of allowed locations (e.g., an employer's offices) in order for the credential to be accessed and/or used. In some implementations, allowed or disallowed locations may be defined as areas within a predefined radius of a point location (e.g., a pair of latitude longitude coordinates or a fixed wireless communications antenna). Additionally or alternatively, a condition 1230 may require that a credential be accessed and/or used during certain times of the day (e.g., during regular business hours). For example, conditions 1230 for a credential may be specified by credential issuing organization system 1218 via communications with credential management application system 1222 through a dedicated interface.

Users 1202, 1208 may access their credentials using a client application 1212 running on their client devices 1204, 1206 that interfaces with application 1220 running on credential management application system 1222. In some implementations, client application 1212 interfaces with application 1220 to allow a user (e.g., user 1208) to validate a credential used by another user (e.g., user 1202).

Application 1220 may enable users (e.g., users 1202, 1208) to upload and store content items (e.g., photographs, text files, audio files, video files, etc.) onto the credential management system 1222 and to electronically sign an uploaded content item using a credential managed by application 1220. For example, uploaded content items may be stored in data repository 1216. When an uploaded content item is electronically signed, it may be stored as part of a package that includes the content item and information identifying one or more credentials that have been used to electronically sign the content item.

Application 1220 may also enable users (e.g., users 1202, 1208) to share electronically signed content items with other users of application 1220. In some implementations, a recipient of an electronically signed content item that has been shared is able to access the electronically signed content item using client application 1212, which displays the accessed content item along with an indication of one or more credentials that have been used to electronically sign the content item.

For example, application 1220 and/or a client application 1212 for interacting with application 1220 may be configured to render one or more of graphical user interfaces 800, 900, 1000, 1100, and/or 1150, as shown in FIGS. 8-10 and 11A-11B, respectively to facilitate sharing of the electronically signed content item.

In an example scenario, user 1202 may register a credential issued by credential issuing organization system 1218 with application 1220 running on credential management application system 1222. User 1202 may thereafter use client device 1204 to create a content item (e.g., by taking a photograph) and use client application 1212 to upload the content item to credential management application system 1222. In addition, user 1202 may use client application 1212 to transmit to credential management application system 1220 an electronic signature request 1224 that identifies the uploaded content item and a particular one of the user's 1202 credentials to be used to electronically sign the uploaded content item (e.g., the credential issued by credential issuing organization system 1218).

In some implementations, a client device (e.g., client device 1204) may store indications of the different credentials available to the user to be used to sign a content item and enable the user to select one or more of these credentials to use to sign the content item. Additionally or alternatively, a server (e.g., credential management system 1222) may store the indications of the different credentials available to the user to be used to sign a content item and enable the user to select one or more of these credentials to use to sign the content item.

Upon receiving the electronic signature request 1224, the application 1220 running on credential management application system 1222 may access the credential record 1226 for the identified credential and check that any conditions 1230 for the credential are satisfied. If the conditions 1230 attached to the credential (if any) are satisfied, then the application 1220 may electronically sign the content item by generating a package that includes the content item and information identifying the credential (e.g., credential ID 1228 and/or some of the user information 1232 stored in credential record 1226). In some implementations, a confirmation message may be transmitted from the credential management system 1222 to the client device 1204 in response to the electronic signature request 1224. The confirmation message may include a copy of the electronically signed content item 1244, which includes the generated package.

In some implementations, at the time of the electronic signing, the credential management application system 1222 may request from the credential issuing organization 1218 that issued the credential selected to be used to electronically sign the content item information about the credential (e.g., if the credential management application system 1222 does not cache the credential record 1226 for the selected credential and/or if the credential management application system 1222 has not updated the credential record 1226 for the selected credential within a defined period of time).

For example, application 1220 and/or a client application 1212 for interacting with application 1220 may be configured to render one or more of graphical user interfaces 100, 200, 300, 400, 500, 600, as shown in FIGS. 1-6, respectively to facilitate uploading and electronic signing of a content item. In some implementations, application 1220 also enables the application of annotations to content items. For example, application 1220 and/or a client application 1212 for interacting with application 1220 may be configured to render one or more of graphical user interfaces 700, 720 and 740, as shown in FIGS. 7A-7C, respectively to facilitate applying an annotation to content item. The application of an annotation to a content item may precede the electronic signing of the content item.

User 1202 may then choose to share the electronically signed content item with user 1208. In some implementations, a sharing invitation may be transmitted from client device 1204 to client device 1206. The sharing invitation may refer to a copy of the electronically signed content item stored in the data repository 1216 by application 1220 and may cause an icon for the electronically signed content item to be presented to user 1208 by client application 1212 running on client device 1206 in a list of signed content items that have been shared with user 1208. In some implementations, when the electronically signed content item is shared with the user 1208, a record may be created in data repository 1216 that indicates that user 1208 is authorized to access the content item. Consequently, when client application 1212 connects to the credential management application system 1222 while user 1208 is logged in, an indication that the electronically signed content item has been shared with user 1208 may be displayed by client application 1212 (e.g., as an icon within a list of icons representing content items that have been shared with user 1208).

If a user 1208 selects the electronically signed content item from this list, then a copy of the electronically signed content item 1244 including the generated package may be transmitted from credential management application system 1222 to client device 1206. The content item may then be presented to user 1208 in a display of client device 1206 and information identifying the credential used to electronically sign the content item (e.g., credential ID 1228 and or user information 1232) may also be presented in the same display.

In some implementations, the electronically signed content item 1244 may be digitally signed by application 1220 using a private key of the application that is paired with a public key that is associated with the credential management application system 1222. Client devices (e.g. client device 1204 and client device 1206) may store or otherwise have access to the public key and may use the public key to confirm the validity of the digital signature generated using the private key. In this manner, the digital signature may provide assurance that the electronically signed content item 1244 was generated by and properly received from the credential management application system 1222.

Figure 13:
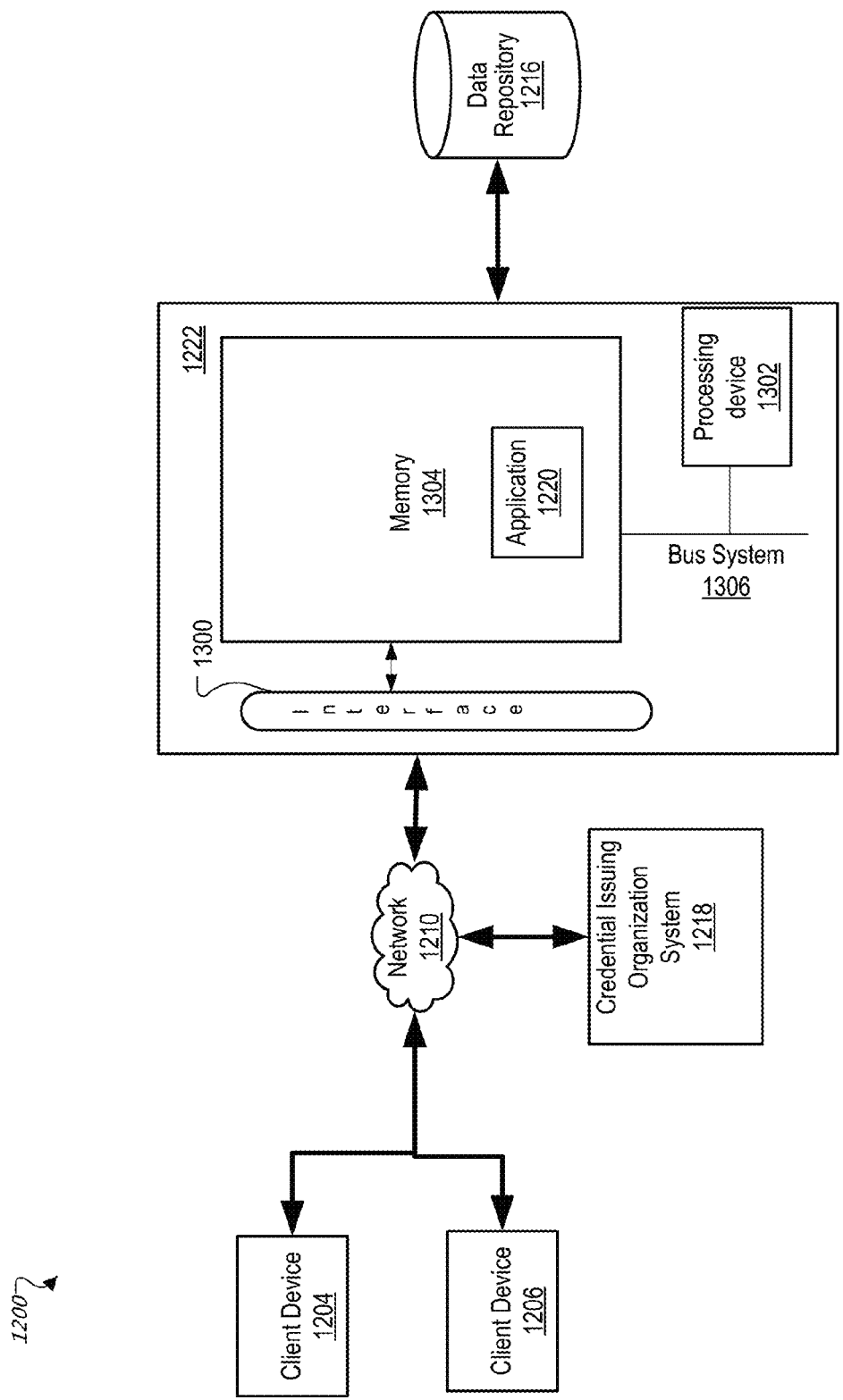
FIG. 13 is a block diagram showing examples of components of a network environment enabling electronic signing of content items with credentials.

FIG. 13 is a block diagram showing examples of components of network environment 1200 enabling sharing and electronic signing of content items with credentials. In the example of FIG. 13, users 1202, 1208, electronic signature request 1224 and electronically signed content item 1244 are not shown.

Application system 1222 can be a variety of computing devices capable of receiving data and running one or more services, including, e.g., application 1220, which can be accessed by one or more of client devices 1204, 1206. In an example, application system 1222 can include a server, a distributed computing system, a desktop computer, a laptop, a cell phone, a rack-mounted server, and the like. Application system 1222 can be a single server or a group of servers that are at a same position or at different positions. Application system 1222 and each of client devices 1204, 1206, and credential issuing organization systems 1217, 1218 can run programs having a client-server relationship to each other.

Application system 1222 can receive data from each of client devices 1204, 1206, and credential issuing organization systems 1217, 1218 through input/output (I/O) interface 1300. I/O interface 1300 can be a type of interface capable of receiving data over a network, including, e.g., an Ethernet interface, a wireless networking interface, a fiber-optic networking interface, a modem, and so forth. Application system 1222 also includes a processing device 1302 and memory 1304. A bus system 1306, including, for example, a data bus and a motherboard, can be used to establish and to control data communication between the components of application system 1222.

Processing device 1302 can include one or more microprocessors. Generally, processing device 1302 can include an appropriate processor and/or logic that is capable of receiving and storing data, and of communicating over a network (not shown). Memory 1304 can include a hard drive and a random access memory storage device, including, e.g., a dynamic random access memory, or other types of non-transitory machine-readable storage devices. As shown in FIG. 13, memory 1304 stores computer programs that are executable by processing device 1302. These computer programs may include a data engine (not shown) for implementing the operations and/or the techniques described herein. The data engine can be implemented in software running on a computer device (e.g., application system 1222), hardware or a combination of software and hardware.

Figure 14:
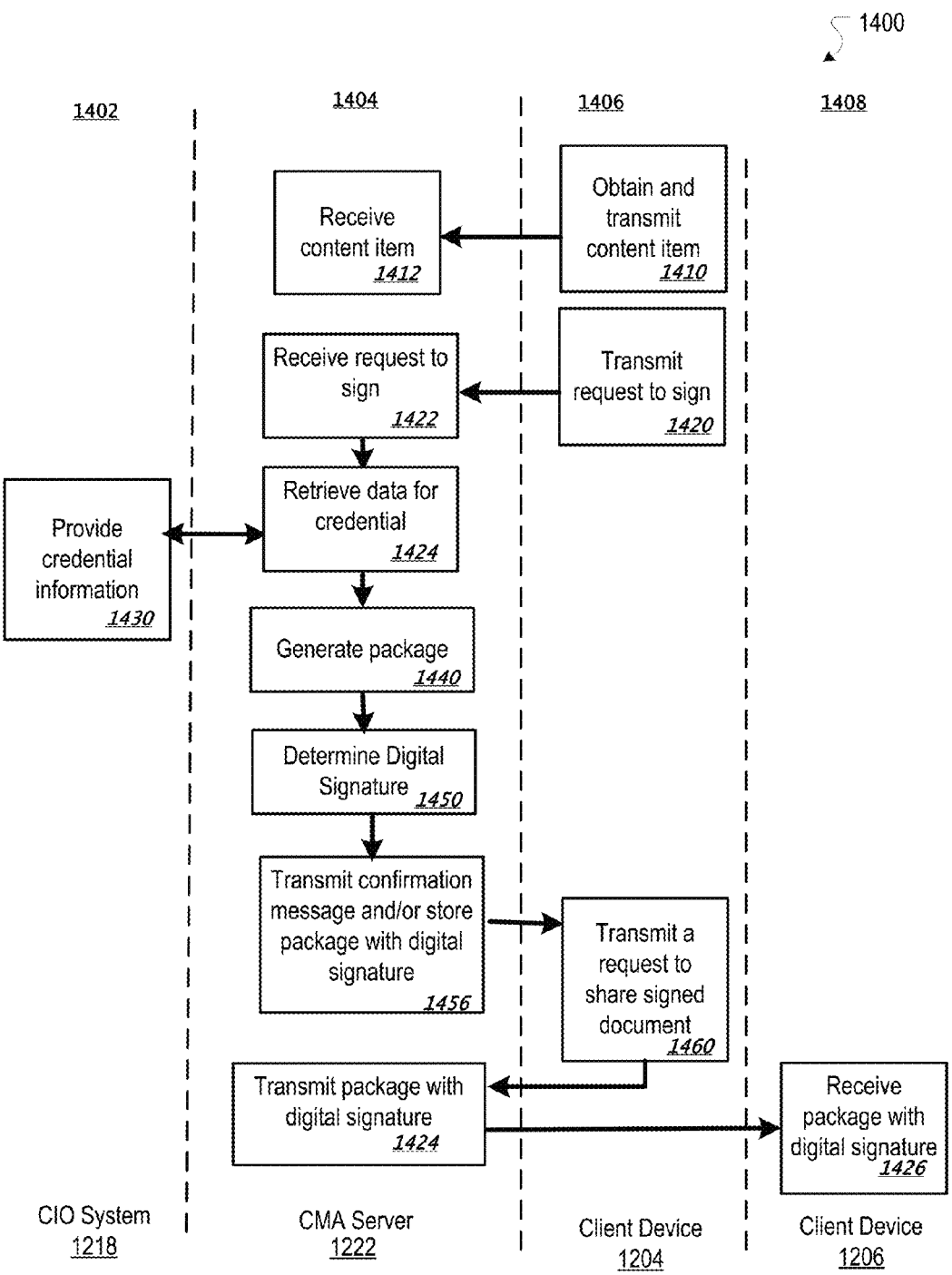
FIG. 14 is a flowchart showing an example of a process for electronically signing a content item with a credential and sharing the electronically signed content item.

FIG. 14 is a flowchart showing an example of a process 1400 for electronically signing and sharing a content item. In FIG. 14, process 1400 is split into parts 1402, 1404, 1406, 1408. Part 1402 may be performed by credential issuing organization (CIO) system 1218. Part 1404 may be performed by credential management application (CMA) system 1222 (and/or by application 1220). Part 1406 may be performed by client device 1204. Part 1408 may be performed by client device 1206.

In operation, client device 1204 obtains and uploads 1410 a content item to the CMA system 1222. In some implementations, the content item is obtained by using a camera to take a photograph. In some implementations, the content item is obtained by using a text editor to create a text file. In some implementations, the content item is obtained by retrieving the content item from a gallery of content items stored on client device 1204. In some implementations, the content item is obtained by retrieving the content item from another application (e.g., an e-mail application) running on the client device 1204. The CMA system 1222 receives 1412 the uploaded content item and may store the content item (e.g., in data repository 1216. Alternatively, in some implementations, the content item already may be stored by the CMA system 1222 before a request to sign the content item is received. For example, the content item previously may have been shared with the user by another user.

The client device 1204 may transmit 1420 a request to electronically sign the content item with a credential registered to a user in the CMA system 1222. The request to sign may identify the content item and a credential that will be used to electronically sign the content item. In some implementations, the request to sign may also indicate a time and/or a location where client device 1204 was located at the time of the request to electronically sign. For example, client device 1204 may determine a time of the request using a clock maintained by the client device 1204 at the time the request to electronically sign is initiated by a user. Alternatively, in some implementations, client device 1204 may determine a time of the request using a trusted timestamp it obtains from a separate time stamping authority (e.g., a time stamping authority computer device or system) at the time the request to electronically sign is initiated by a user, or the credential management application system 1222 may determine the time of an electronic signature based on the time when the request to electronically sign is received. Furthermore, client device 1204 may determine a location of the request using a global positioning system (GPS) receiver integrated in the client device 1204 at the time the request to electronically sign is initiated by a user.

Upon receiving 1422 the request to electronically sign the content item, the CMA system 1222 may retrieve 1424 data for the identified credential. In some implementations, data for the identified credential is retrieved 1424 from a credential record stored in the data repository 1216. Additionally or alternatively, the CMA system may retrieve 1424 some or all of the data for the identified credential from CIO system 1218, which provides 1430 credential and/or user information for credentials that is has issued.

A package is generated 1440 that includes the content item and some or all of the retrieved credential data, including data identifying the credential used to electronically sign the content item. Additionally or alternatively, in some implementations, the package may include a reference (e.g., a link) to information about the credential used to electronically sign the content item such that the credential information for the credential used to electronically sign the content item may be retrieved by interaction with the reference. In some implementations, the package may also include an indication of a time and/or a location where the document was electronically signed (e.g., where the client device requesting the electronic signature was located at the time). In some implementations, the package may use predefined internal structures to contain the content item and the retrieved credential data.

Furthermore, in some implementations, a digital signature is determined 1450 for the generated package. The digital signature may be determined 1450 based in part on a private key paired with a public key that is associated with the CMA system 1222. The digital signature may be transmitted and/or stored 1456 along with the package to provide assurance to a recipient that a received electronically signed content item was truly generated by the CMA system 1222 as it appears in a received transmission.

An electronic signature confirmation message may be transmitted 1456 to client device 1204 in response to the request to electronically sign the content item. The confirmation message may include or be accompanied by a copy of the electronically signed content item with the digital signature for the package.

After the content item has been electronically signed, a user of client device 1204 may request that the electronically signed content item be shared with one or more other users. For example, client device 1204 may transmit 1460 to the CMA system 1222 a request to share the electronically signed content item with one or more other users, including a user associated with client device 1206. In response to receiving the request to share the electronically signed content item, the CMA system 1222 may transmit 1470 to client device 1206 the package along with the digital signature of the CMA system 1222. In some implementations, when the electronically signed content item is shared with a recipient, a record on the CMA system 1222 may be updated to reflect that the electronically signed content item has been shared with the recipient. Consequently, an indication that the electronically signed content item has been shared with the recipient may be provided to the recipient. Thereafter, the CMA system 1222 may provide the recipient with access to the document responsive to interaction with the provided indication that the electronically signed content item has been shared with the recipient.

Client device 1206 may receive 1476 the package with the digital signature from the CMA system 1222. Client device 1206 may use the public key associated with the CMA system 1222 to check the digital signature and confirm that the CMA system 1222 created the received package. The content item and data identifying the credential from the package may then be presented in a display of client device 1206. Client device 1206 may allow a user to access additional data regarding the credential used to electronically sign the content item and/or a user associated with the credential.

Figure 15:
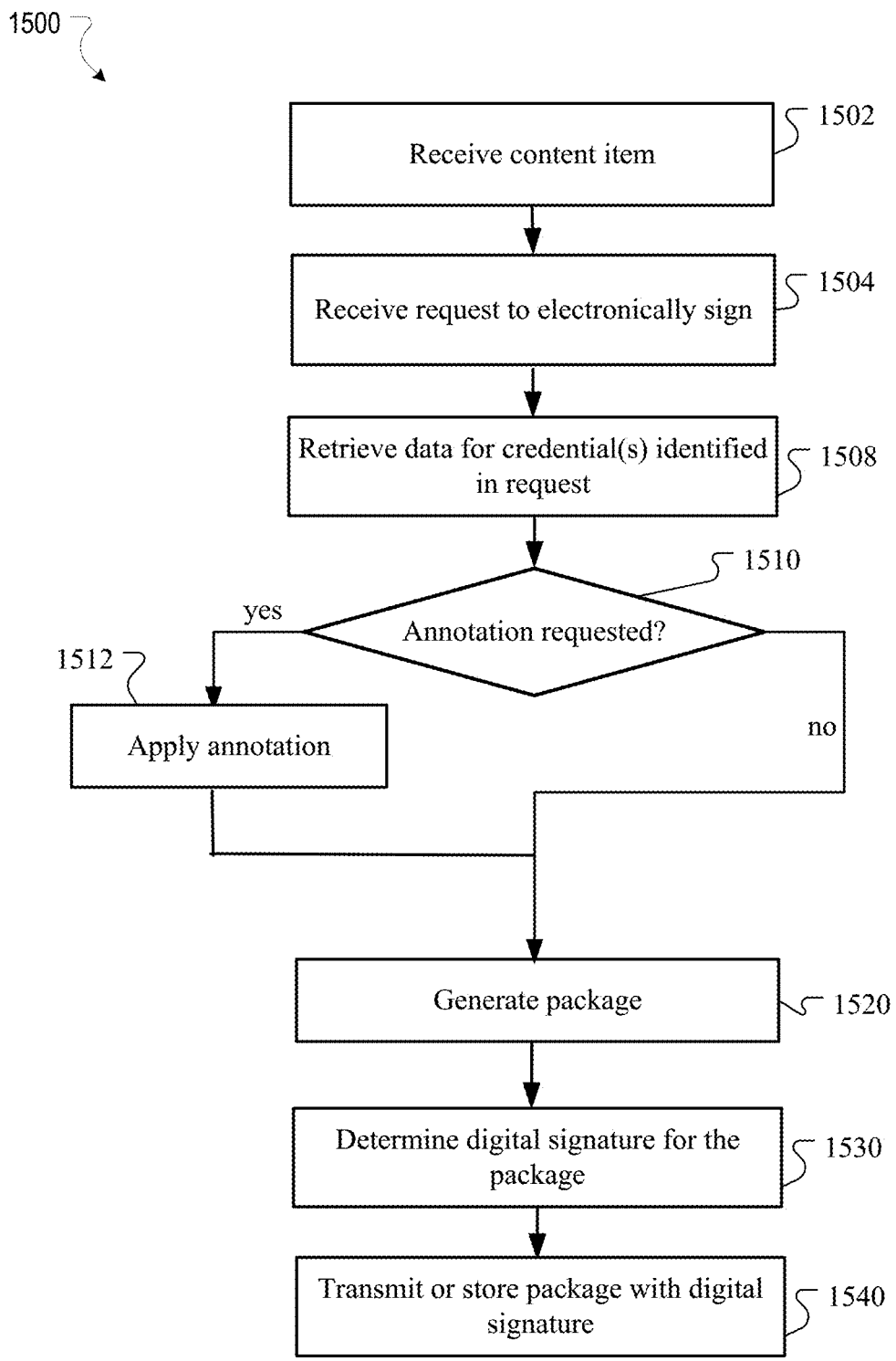
FIG. 15 is a flowchart showing an example of a process for electronically signing a content item with a credential.

FIG. 15 is a flowchart showing an example of a process 1500 for electronically signing a content item with a credential. A package is generated including the content item and data identifying one or more credentials that are used to electronically sign the content item. In some implementations, an annotation may be applied to the content item that is incorporated in the package. In some implementations, the package may be digitally signed by a system that is trusted to manage the credentials. For example, process 1500 may be performed by application system 1222.

The process 1500 may include receiving 1502 a content item. For example the content item may include a text file, an image file (e.g., a photograph), a video file, or an audio file, among other types of data. In some implementations, the content item is obtained by a user using a client application (e.g., client application 1212) running on a client device and uploaded to a server system that manages credentials. For example, a physical document (e.g., a page from a book) may be converted into a digital document that may be electronically signed by taking a photograph of the physical document. For example, the content item may be received 1502 through network interface 1300 of application system 1222.

A request to electronically sign the content item is received 1504 that includes data identifying one or more credentials that will be associated with the content item to electronically sign the content item. The identified credential(s) may be selected from among a set of multiple stored credentials that are associated with a single user. For example, an interface similar to graphical user interface 400 of FIG. 4 may be used by a user to select from among the user's own credentials in forming the request to electronically sign the content item. The request to electronically sign the content item may be received 1504 from a client device associated with a user registered to use the identified one or more credentials. The request to electronically sign the content item may also include a time and/or location associated with the request to electronically sign. For example, the request to electronically sign the content item may be received 1504 through network interface 1300 of application system 1222.

Data for the credential(s) identified in the request to electronically sign the content item may be retrieved 1508. In some implementations, data for a credential is retrieved from a record for the credential that is maintained in a storage device that is local to the one or more processing devices (e.g., from credential record 1226 in data repository 1216). In some implementations, data for a credential is retrieved 1508 from a credential issuing organization that issued the credential (e.g., from credential issuing organization system 1218. A request for data regarding the credential may be transmitted to a credential issuing organization system. For example, data for the identified credential(s) may be retrieved 1508 through network interface 1300 of application system 1222.

In some implementations, the data retrieved for a credential may include one or more conditions on the use of the credential for electronic signing of content items. These condition(s) may be checked to determine if they are satisfied. In some implementations, a condition requires a request to electronically sign the content item to be sent within one or more specified periods of time (e.g., before a deadline, during business hours, on the last day of a financial quarter). In some implementations, a condition requires a request to electronically sign the content item to be sent from within one or more specified geographic regions (e.g., from a user's home, from one of an employer's offices, or from within certain designated countries). If the conditions for use of the credential are satisfied, then the electronic signing process 1500 may proceed.

In some implementations, a request to apply an annotation to the content item may be received. For example, during the electronic signature request process on a client device running client application 1212, a user electronically signing the content item may be presented with the option to apply an annotation to the content item as described in relation to FIGS. 7A-7C. If annotation of the content item is requested 1510, then a selected annotation may be applied 1512 to the content item. In some implementations, an annotation is an image that is superimposed or overlaid on a visual component of a content item. In the case of an audio file, an annotation may be overlaid on a visual representation of the audio file that is displayed by an audio file player application. For example, an annotation may be applied 1512 to the content item by application 1220 running on application system 1222.

In some implementations, the annotation includes an image of a handwritten set of initials for a user associated with one or more of the credential(s) that will be used to electronically sign the content item. An annotation may include other information about a user associated with one or more of the credential(s) that will be used to electronically sign the content item, such as printed name of the user. In some implementations, the annotation includes an indication of the time and/or location where the request to electronically sign the content item was generated.

In some implementations, the annotations available to be applied to a content item may depend upon the particular credential of the user selected to be used to electronically sign the content item. For example, each credential available to the user may be associated with a selection of different annotations that can be applied to the content item such that different annotations may be available depending on which credential is being used to sign the content item. In alternative implementations, annotations may be associated with an individual user more generally rather than with particular credentials of the user. In such implementations, the user may select an annotation that generally is associated with the user to be applied to the content item before selecting a credential to use to electronically sign the content item.

A package may be generated 1520 that includes the content item and data identifying one or more credentials that are being used to electronically sign the content item. The package may be generated to include a credential identifier (e.g., credential ID 1228) and/or data reflecting characteristics of the user associated with the credential. In some implementations, the package may be generated to include a photograph of a user associated with the credential, which may be displayed to another user who reviews the electronically signed content item.

In some implementations, the package may be generated to include data reflecting a time associated the request to electronically sign the content item. In some implementations, the package may be generated to include data reflecting a geographic location associated the request to electronically sign the content item. This time and location data for the electronic signature may also be presented to a user with whom the electronically signed content item is shared.

In some implementations, the request to electronically sign the content item identifies multiple credentials associated with the same user to be used to electronically sign the content item. Additionally or alternatively, the user may submit a series of multiple requests to sign the same content item with different ones of the user's credentials. For example, if the user requests to electronically sign the content item with a second credential of the user, the package may be generated to include data for a second credential in addition to the data for the first credential of the user. In some cases, the second credential may be issued by the same credential issuing organization as the first credential used to electronically sign the content item. In other cases, the second credential may be issued by a different credential issuing organization than the first credential used to electronically sign the content item. For instance, referring again to the examples introduced above in connection with FIGS. 1-6 and 7A-7C, the user John Doe may request to electronically sign photograph 302 using his employee credential 404. In addition, John Doe also may request to electronically sign the photograph 302 with his college alumni association credential 406. The resulting electronically signed content item then may be shared with and displayed to other users with indications of both credentials 404, 406 being presented with the photograph 302.

In some implementations, multiple users may electronically sign the same content item. In such cases, multiple requests to electronically sign the content item may be received from multiple different users. For example, first and second requests to electronically sign the content item may be received from different users. In such cases, the package may be generated to include data for the credential of the first user and data for the credential of the second user. For example, a purchase order may need to be approved by two employees of a company before it can be processed for payment by the company's finance department. A first employee may electronically sign a purchase order using the first employee's employee credential and then share the electronically signed purchase order with a second employee of the company. The second employee may review the purchase order and then electronically sign the purchase order using the second employee's employee credential. The second employee then may share the purchase order with the two electronic signatures with a third employee in the finance department for processing.

In some implementations, the package is generated by appending the data identifying the one or more credentials to the content item in a larger file or other data structure. For example, the package may be generated 1520 by application 1220 running on application system 1222.

In some implementations, a digital signature is determined 1530 for the package. The digital signature may be determined based in part on a private key that corresponds to a public key associated with an entity that manages the set of stored credentials for a group of users. For example, the digital signature may be determined based on a hash function that is applied to the package and the result of the hash function may be encrypted with the private key. When a user receives the electronically signed content item (e.g., as a shared document), the user's client device (e.g., running client application 1212) may confirm that the package was correctly received from an entity that manages the credentials by checking the digital signature with the public key associated with that entity. For example, the user's client device may apply the same hash function to the received package and compare the result to the result of decrypting the digital signature with the public key. If the results match, then the package may be considered to have been generated by the trusted entity that manages the credentials. For example, the digital signature for the package may be determined 1530 by application 1220 running on application system 1222.

The package may be transmitted or stored 1540 with the digital signature for the package. For example, the package and the digital signature may be transmitted 1540 to a client device associated with the user requesting the electronic signature and/or a client device associated with a different user that will receive the electronically signed content item as a shared content item. For example, the package with the digital signature may be transmitted 1518 through network interface 1300 of application system 1222.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible program carrier for execution by, or to control the operation of, a processing device. Alternatively or in addition, the program instructions can be encoded on a propagated signal that is an artificially generated signal, e.g., a machine-generated electrical, optical, or electromagnetic signal that is generated to encode data for transmission to suitable receiver apparatus for execution by a processing device. The machine-readable medium can be a machine-readable storage device, a machine-readable storage substrate, a random or serial access memory device, or a combination of one or more of them.

The term "processing device" encompasses all kinds of apparatus, devices, and machines for processing data, including by way of example a programmable processor, a computer, or multiple processors or computers. The processing device can include special purpose logic circuitry, e.g., an FPGA (field programmable gate array) or an ASIC (application-specific integrated circuit). The processing device can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer may be a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Furthermore, in some implementations, an electronic signature as described herein may be applied at a client device rather than at a server system. For example, a package for the electronically signed content item including the content item and information about the credential used to electronically sign the content item may be generated by a client device in response to user commands received at the client device. Additionally or alternatively, in such implementations, the client device may apply a digital signature to the content item using a private key associated with the credential selected as the credential to be used to electronically sign the content item. Other users with whom the digitally signed content item subsequently is shared then can confirm the validity of the digital signature using the public key paired with the private key associated with the credential used to electronically sign the content item. In some such implementations, the public key only may be accessible to other users who also hold the same credential as the credential used to electronically sign the content item (or other users who hold a credential issued by the same credential issuing organization as the credential used to electronically sign the content item).

What is claimed is:

1. A method, performed by one or more processing devices, comprising:
   receiving, from a client device of a user, a request to perform an operation on a content item;
   in response to the request,
   retrieving, from a data repository by the one or more processing devices, a set of different credentials for the user that are issued by a plurality of different credential issuing entities, with the set of different credentials being aggregated from the plurality of different credential issuing entities that issue the different credentials;
   providing, to the client device, information identifying of the plurality of different credentials;
   receiving, from the client device, information indicative of a selection of a credential from among the set of different credentials for the user;
   associating the content item with the selected credential associated with the user; and
   generating a package comprising the content item and data for the selected credential to enable performance of the operation on the content item with the selected credential.

2. The method of claim 1, in which generating the package further comprises including, in the package, data reflecting a time associated the request t.

3. The method of claim 1, in which generating the package further comprises including, in the package, data reflecting a geographic location associated with the request.

4. The method of claim 1, further comprising:
   transmitting the package to another client device associated with a different user.

5. The method of claim 1, further comprising:
   retrieving the data for the selected credential from a data storage device that is local to the one or more processing devices.

6. The method of claim 1, further comprising:
   retrieving the data for the selected credential from a remote processing device associated with an entity that issued the selected credential.

7. The method of claim 1, further comprising embedding, in the content item, a QR code within which a reference to the data for the selected credential is encoded.

8. The method of claim 1, in which the data for the selected credential comprises a photograph of a user associated with the selected credential.

9. The method of claim 1, further comprising:
   checking whether a condition associated with the selected credential is satisfied by the request; and
   proceeding to generate the package responsive to determining that the condition is satisfied.

10. One or more machine-readable hardware storage devices storing instructions that are executable by one or more processing devices to perform operations comprising:
    receiving, from a client device of a user, a request to perform an operation on a content item;
    in response to the request,
    retrieving, from a data repository by the one or more processing devices, a set of different credentials for the user that are issued by a plurality of different credential issuing entities, with the set of different credentials being aggregated from the plurality of different credential issuing entities that issue the different credentials;
    providing, to the client device, information identifying of the plurality of different credentials;
    receiving, from the client device, information indicative of a selection of a credential from among the set of different credentials for the user;
    associating the content item with the selected credential associated with the user; and
    generating a package comprising the content item and data for the selected credential to enable performance of the operation on the content item with the selected credential.

11. The one or more machine-readable hardware storage devices of claim 10, in which generating the package further comprises including, in the package, data reflecting a time associated the request.

12. The one or more machine-readable hardware storage devices of claim 10, in which generating the package further comprises including, in the package, data reflecting a geographic location associated with the request.

13. The one or more machine-readable hardware storage devices of claim 10, wherein the operations further comprise:
    transmitting the package to another client device associated with a different user.

14. The one or more machine-readable hardware storage devices of claim 10, wherein the operations further comprise:
    retrieving the data for the selected credential from a data storage device that is local to the one or more processing devices.

15. The one or more machine-readable hardware storage devices of claim 10, wherein the operations further comprise:
    retrieving the data for the selected credential from a remote processing device associated with an entity that issued the selected credential.

16. An electronic system comprising:
    one or more processing devices; and
    one or more machine-readable hardware storage devices storing instructions that are executable by the one or more processing devices to perform operations comprising:
    receiving, from a client device of a user, a request to perform an operation on a content item;
    in response to the request,
    retrieving, from a data repository by the one or more processing devices, a set of different credentials for the user that are issued by a plurality of different credential issuing entities, with the set of different credentials being aggregated from the plurality of different credential issuing entities that issue the different credentials;
    providing, to the client device, information identifying of the plurality of different credentials;
    receiving, from the client device, information indicative of a selection of a credential from among the set of different credentials for the user;
    associating the content item with the selected credential associated with the user; and generating a package comprising the content item and data for the selected credential to enable performance of the operation on the content item with the selected credential.

17. The electronic system of claim 16, in which generating the package further comprises including, in the package, data reflecting a time associated the request.

18. The electronic system of claim 16, in which generating the package further comprises including, in the package, data reflecting a geographic location associated with the request.

19. The electronic system of claim 16, wherein the operations further comprise:
   transmitting the package to another client device associated with a different user.

20. The electronic system of claim 16, wherein the operations further comprise:
   retrieving the data for the selected credential from a data storage device that is local to the one or more processing devices.

* * * * *